United States Patent
Yoshida

(10) Patent No.: US 9,807,296 B2
(45) Date of Patent: Oct. 31, 2017

(54) IMAGE CAPTURING APPARATUS AND AUTO FOCUS CONTROL METHOD THEREFOR

(71) Applicant: CANON KABUSHIKI KAISHA, Tokyo (JP)

(72) Inventor: Koji Yoshida, Fujisawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/241,963

(22) Filed: Aug. 19, 2016

(65) Prior Publication Data

US 2017/0064188 A1 Mar. 2, 2017

(30) Foreign Application Priority Data

Aug. 26, 2015 (JP) .................. 2015-166982

(51) Int. Cl.
*H04N 5/232* (2006.01)
(52) U.S. Cl.
CPC ..... *H04N 5/23212* (2013.01); *H04N 5/23219* (2013.01); *H04N 5/23293* (2013.01); *H04N 5/23296* (2013.01)
(58) Field of Classification Search
CPC ........... H04N 5/23212; H04N 5/23219; H04N 5/23293; H04N 5/23296
See application file for complete search history.

(56) References Cited

U.S. PATENT DOCUMENTS

| | | | |
|---|---|---|---|
| 2014/0176785 A1* | 6/2014 | Sambonsugi | H04N 5/23212 348/350 |
| 2016/0301878 A1* | 10/2016 | Hada | G02B 7/102 |
| 2016/0373655 A1* | 12/2016 | Kobayashi | H04N 5/23216 |

FOREIGN PATENT DOCUMENTS

JP 2008-211630 A 9/2008

* cited by examiner

*Primary Examiner* — Tuan Ho
(74) *Attorney, Agent, or Firm* — Canon USA Inc., IP Division

(57) ABSTRACT

In an image capturing apparatus, in a case where a change is made from a first magnification ratio into a second magnification ratio which is greater than the first magnification ratio in a state in which a live view is displayed at the first magnification ratio and a first AF mode is set, the live view image is enlarged and displayed at the second magnification ratio, and the AF mode is set to a second AF mode. In a case where a change to the first magnification ratio is made after the second magnification ratio is set, the first AF mode is set, and a focus adjustment position is set based on a focus adjustment position which is set in the second AF mode.

13 Claims, 11 Drawing Sheets

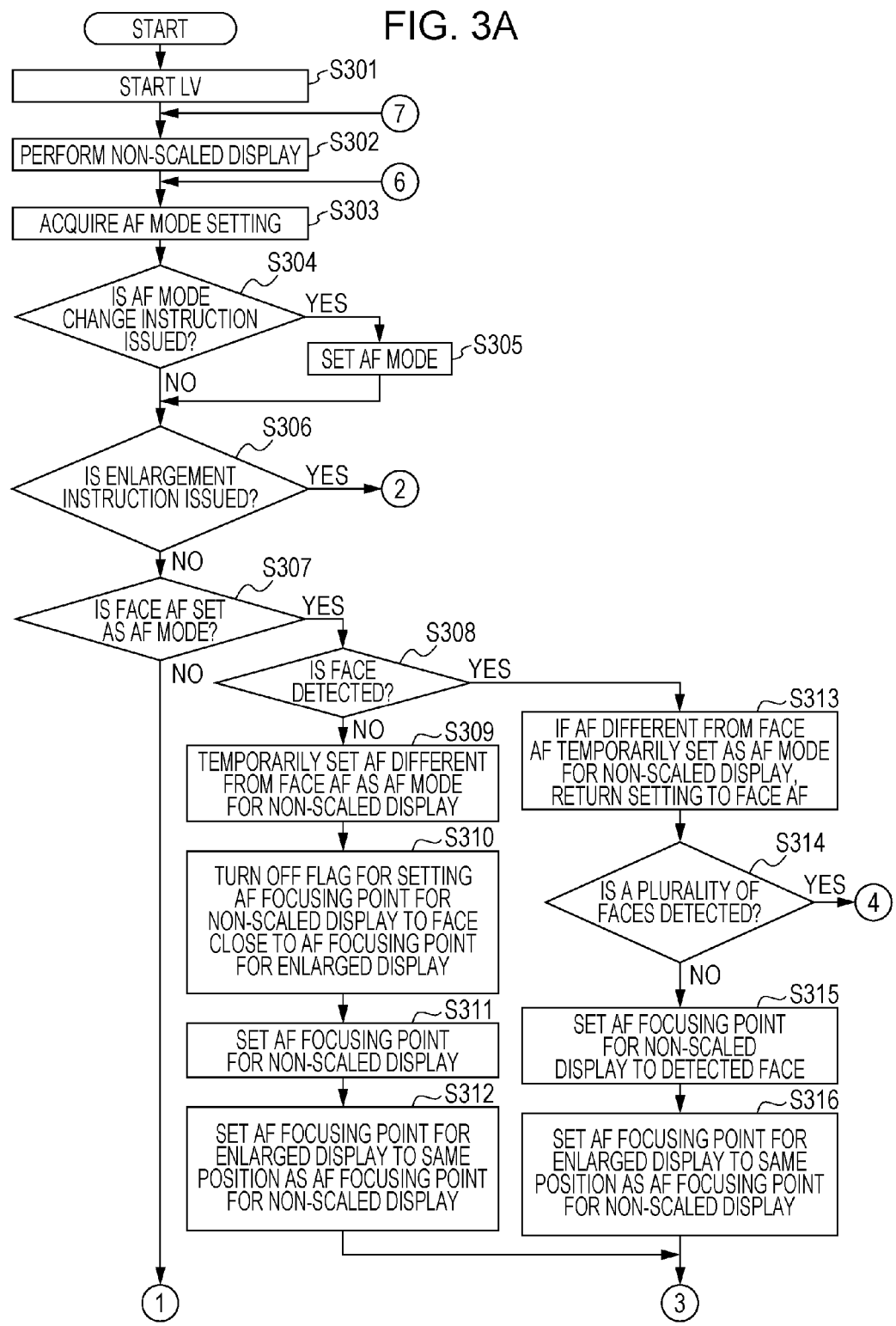

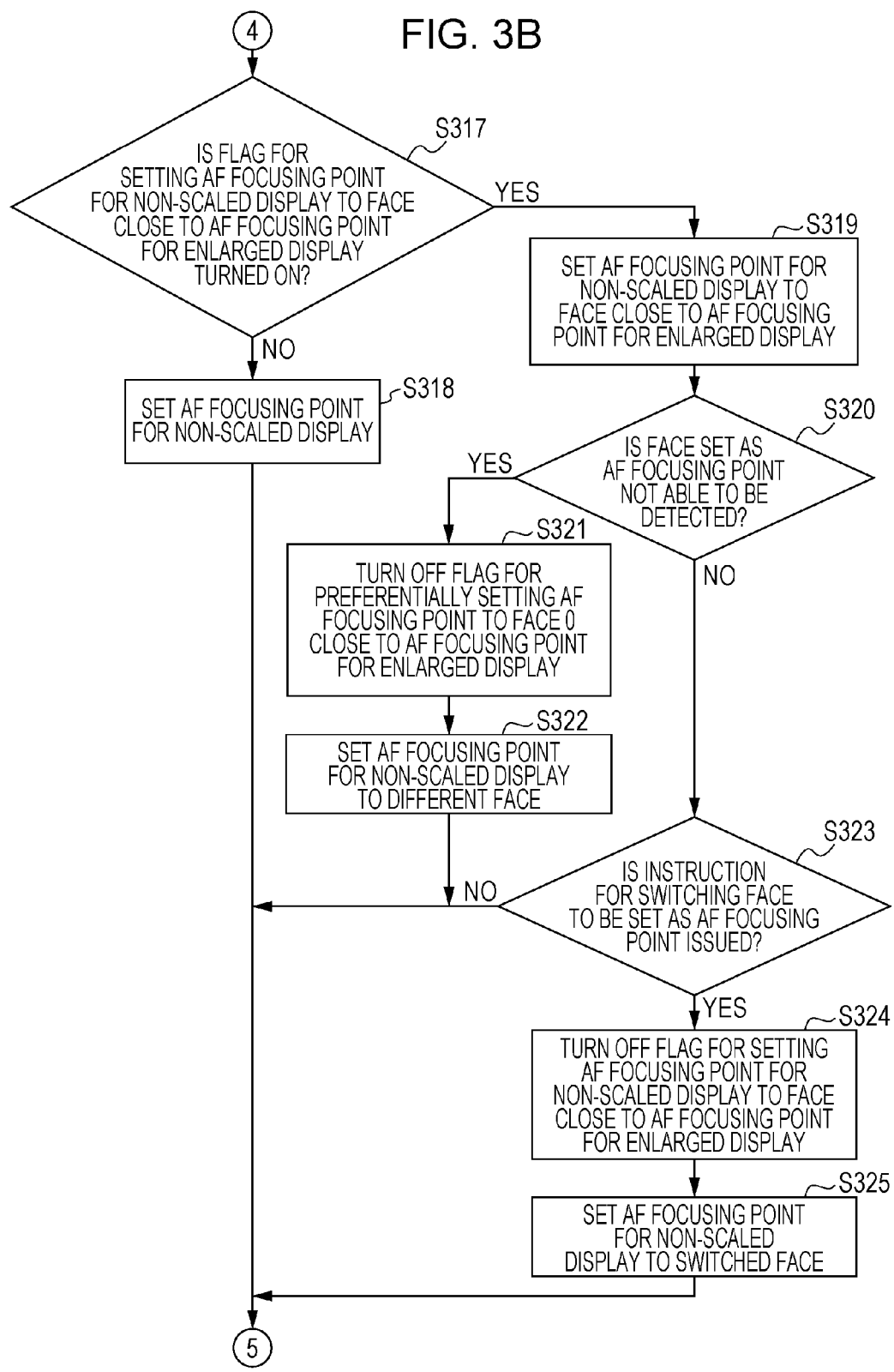

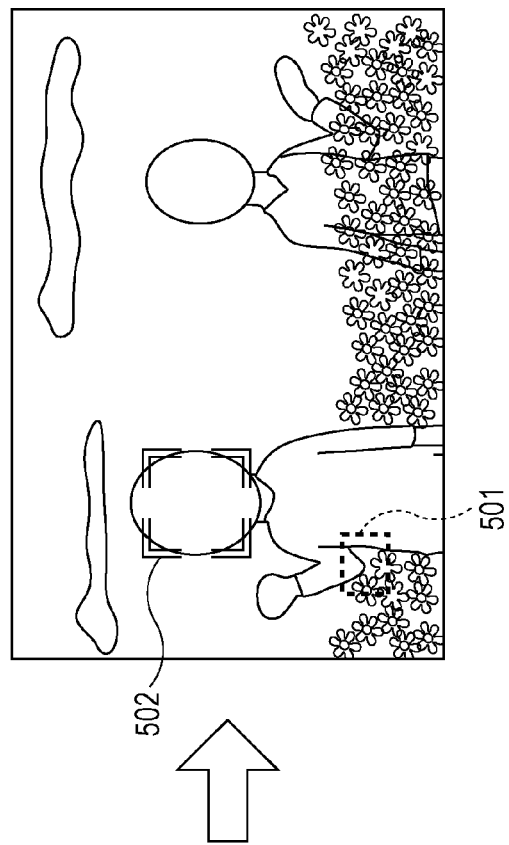
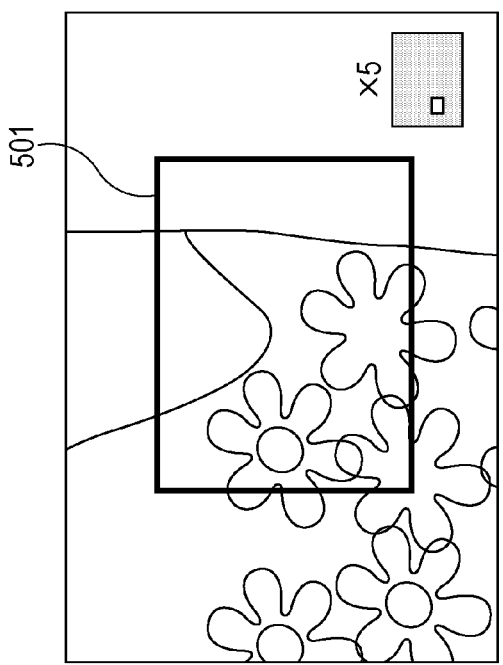

IMAGE CAPTURING APPARATUS AND AUTO FOCUS CONTROL METHOD THEREFOR

BACKGROUND OF THE INVENTION

Field of the Invention

The present invention relates, in particular, to an image capturing apparatus capable of setting focusing points for autofocus (AF) at different magnification ratios, and a control method for the image capturing apparatus.

Description of the Related Art

Image capturing apparatuses which set positions of focusing points in an autofocus (AF) mode (hereinafter, referred to as AF focusing points) for non-scaled display and enlarged display in a live view are known. A technique for continuously setting the same AF focusing points for non-scaled display and enlarged display is disclosed, for example, in Japanese Patent Laid-Open No. 2008-211630.

However, in the technique disclosed in Japanese Patent Laid-Open No. 2008-211630, it is assumed that the type of operating AF mode is the same between non-scaled display and enlarged display. Therefore, in the case where the type of operating AF mode is different between non-scaled display and enlarged display, in particular, in the case where the position of an AF focusing point is different between non-scaled display and enlarged display, this technique cannot be adopted. Accordingly, in the case where the type of operating AF mode is different between non-scaled display and enlarged display, AF operations need to be performed independently with corresponding magnification ratios.

SUMMARY OF THE INVENTION

An aspect of the present invention is directed to linking (synchronizing) the position of a focusing point for non-scaled display with the position of a focusing point for enlarged display in the case where a type of operating AF mode is different between the non-scaled display and the enlarged display.

An image capturing apparatus includes an image capturing unit; a display controller configured to perform control such that a live view image which is captured by the image capturing unit is displayed on a display unit; a magnification ratio changing unit configured to change a magnification ratio of the live view image which is displayed on the display unit; an AF mode setting unit configured to set one of a plurality of AF modes in which a focus adjustment position to be used for focus detection is selected according to the set AF mode; and a controller configured to perform control such that in a case where a first AF mode is set by the AF mode setting unit and a change is made from a first magnification ratio to a second magnification ratio which is greater than the first magnification ratio by the magnification ratio changing unit, the live view image is enlarged and displayed at the second magnification ratio and the AF mode is set to a second AF mode, and such that in a case where a change to the first magnification ratio is made after the second magnification ratio is set, the first AF mode is set and the focus adjustment position is set based on a focus adjustment position which is set in the second AF mode.

Further features of the present invention will become apparent from the following description of exemplary embodiments with reference to the attached drawings.

BRIEF DESCRIPTION OF THE DRAWINGS

FIGS. 3A to 3C are flowcharts illustrating an example of a processing procedure for setting an AF focusing point operating for non-scaled display.

FIGS. 5A to 5B are diagrams for explaining linkage of AF focusing points at a time when display is switched from enlarged display to non-scaled display.

DESCRIPTION OF THE EMBODIMENTS

An exemplary embodiment of the present invention will be described in detail below with reference to the accompanying drawings.

It is to be noted that the following exemplary embodiment is one example for implementing the present invention and can be appropriately modified or changed depending on individual constructions and various conditions of apparatuses to which the present invention can be applied. Thus, the present invention is not limited to the following exemplary embodiment.

Figure 1A:
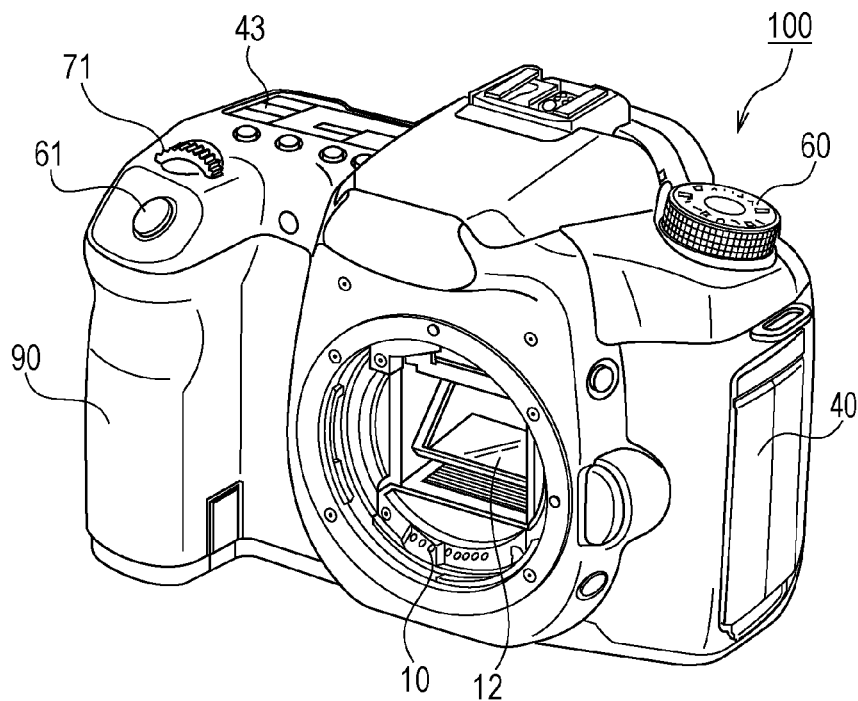
FIGS. 1A and 1B are diagrams illustrating an example of an external configuration of a digital camera according to an embodiment.
Figure 1B:
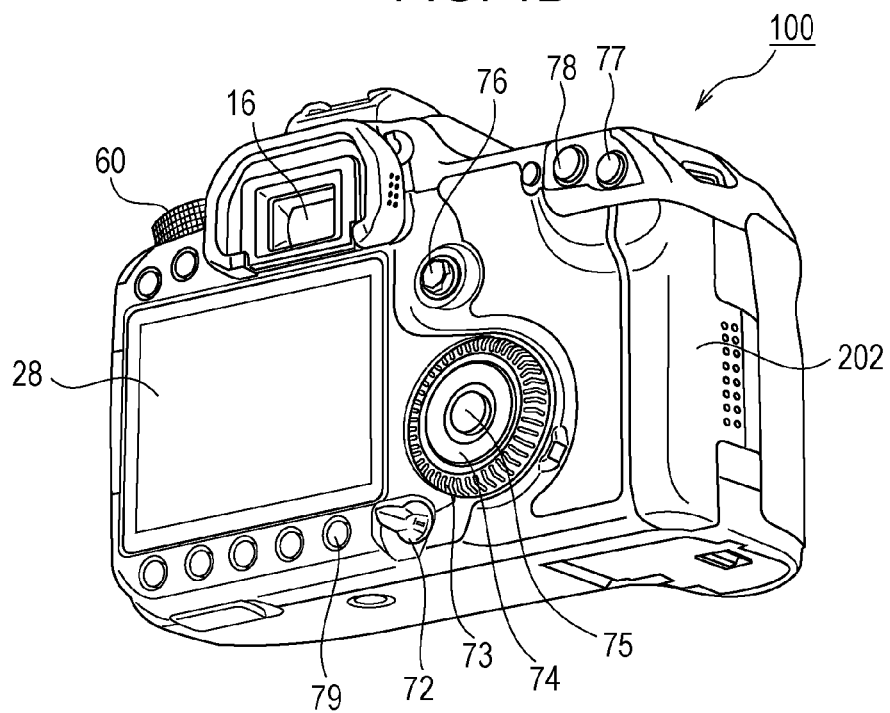

FIGS. 1A and 1B are diagrams illustrating an example of an external configuration of a digital camera 100 as an example of an image capturing apparatus according to an embodiment. FIG. 1A is a perspective view illustrating a front configuration of the digital camera 100. FIG. 1B is a perspective view illustrating a rear configuration of the digital camera 100.

In FIGS. 1A and 1B, a display unit 28 is a display device which is provided on the rear surface of the digital camera 100, and images and various types of information are displayed on the display unit 28. A display unit 43 outside of a viewfinder is a display unit which is provided on the top surface of the digital camera 100, and various setting values regarding the digital camera 100 including a shutter speed and a diaphragm opening are displayed on the display unit 43. A shutter button 61 is an operation unit for issuing an image capturing instruction. A mode selection switch 60 is an operation unit for switching between various operating modes. The types of mode will be described later with reference to FIG. 2. A terminal cover 40 is a cover which protects a connector (not illustrated in FIGS. 1A and 1B) for a connection cable, such as a connection cable which allows connection between an external apparatus and the digital camera 100.

An electronic main dial 71 is a rotational operation member. When a user adjusts the electronic main dial 71, setting values including the shutter speed and the diaphragm opening value may be changed. A power switch 72 is an operation member for switching ON and OFF the power of the digital camera 100. An electronic sub-dial 73 is a rotational operation member, and is used for moving a selection frame, image feeding, and the like.

A cross key 74 is a cross key (four-direction key) whose upper, lower, left, and right portions may be pressed. An operation corresponding to a pressed portion of the cross key 74 may be performed. A SET button 75 is a push button, and is mainly used for accepting or confirming a selection item. An LV button 76 is a button for switching ON and OFF a live view (hereinafter, referred to as "LV") in a menu button. In a moving image capturing mode, the LV button 76 is used for starting or stopping capturing (recording) of a moving image.

A zoom button 77 is an operation button for enlarging an image by adjusting the angle of view for live view display in an image capturing mode or enlarging a playback image in a playback mode. The zoom button 77 functions as a button for increasing the enlargement ratio to enlarge a live view image or a playback image in the playback mode. A reduction button 78 is a button for reducing the enlargement ratio of an enlarged playback image to reduce the displayed image. A playback button 79 is an operation button for switching between the image capturing mode and the playback mode. In the case where the playback button 79 is pressed during the image capturing mode, the mode is switched to the playback mode, and the latest image of images recorded in a recording medium may be displayed on the display unit 28.

A quick-return mirror 12 is moved upwards and downwards by an actuator, which is not illustrated in FIGS. 1A and 1B. A communication terminal 10 is a terminal which allows the digital camera 100 to communicate with a detachable lens unit. A viewfinder 16 is a finder of a look-in type for confirming focus and framing of an optical image of an object obtained through the lens unit by observing a focusing screen 13. A lid 202 is a slot lid for storing a recording medium. A grip unit 90 is a holding portion with a shape which is easily gripped in the right hand of a user when the user holds the digital camera 100 for operation.

Figure 2:
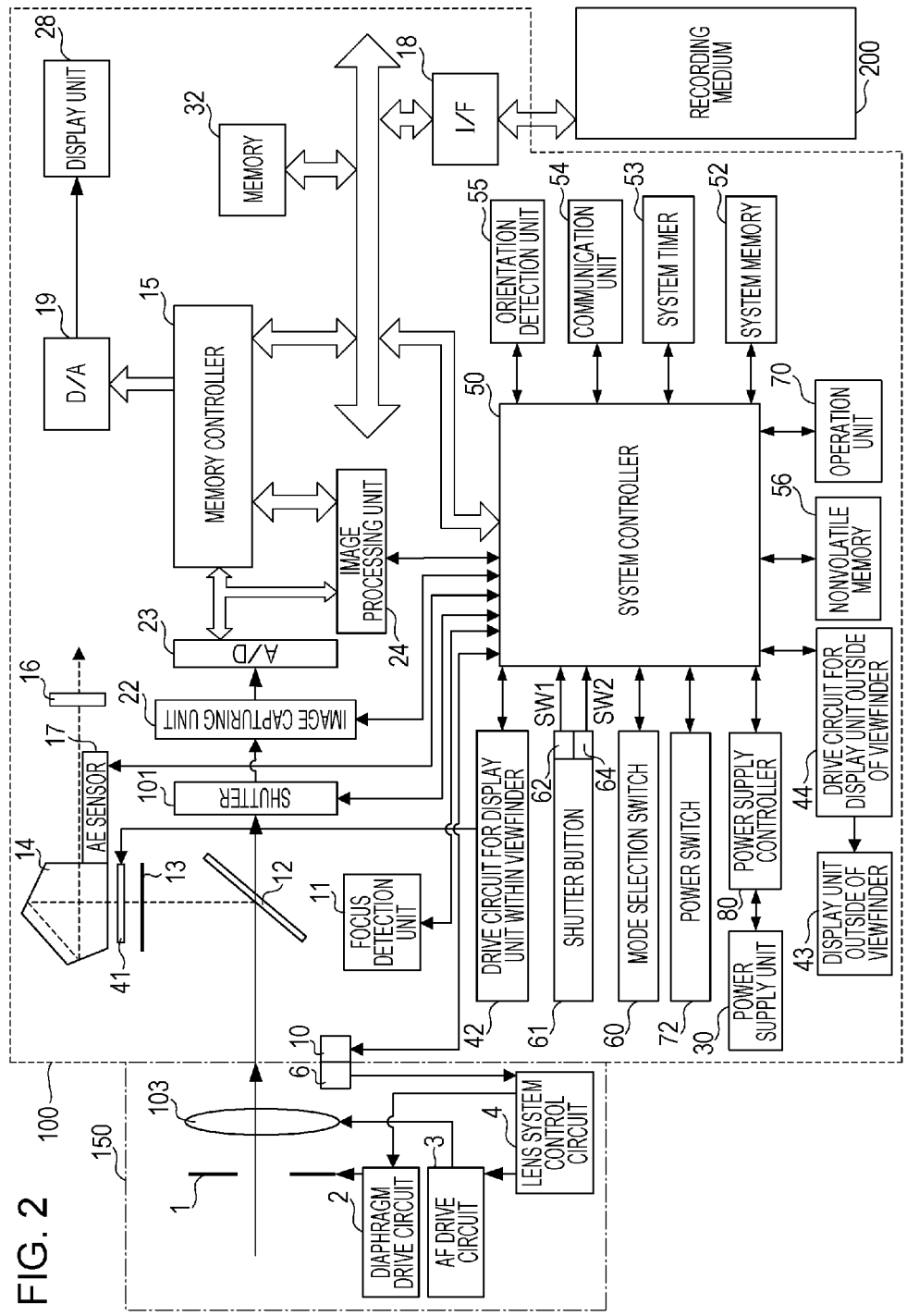
FIG. 2 is a block diagram illustrating an example of an internal configuration of a digital camera according to an embodiment.

FIG. 2 is a block diagram illustrating an example of an internal configuration of the digital camera 100 according to this embodiment.

In FIG. 2, a lens unit 150 is a lens unit which is equipped with exchangeable image capturing lenses, and is attached to the digital camera 100. Next, the lens unit 150 will be described below in more detail.

In general, a lens 103 includes a plurality of lenses. However, in FIG. 2, the lens 103 is illustrated as a single lens for ease of illustration. A communication terminal 6 is a communication terminal for allowing the lens unit 150 to communicate with the digital camera 100; the communication terminal 6 is connected to the communication terminal 10 described above. The lens unit 150 communicates with a system controller 50 through the communication terminals 6 and 10, and controls a diaphragm 1 through a diaphragm drive circuit 2 by a lens system control circuit 4. Then, the lens unit 150 adjusts focus by displacing the position of the lens 103 through an AF drive circuit 3.

Next, an internal configuration of the digital camera 100 according to this embodiment will be described below.

An AF sensor 17 measures and detects the brightness of an object through the lens unit 150. A focus detection unit 11 outputs defocus amount information to the system controller 50. The system controller 50 controls the lens unit 150 based on the defocus amount information to perform phase difference AF.

The quick-return mirror 12 (hereinafter, referred to as a mirror 12) is moved upwards and downwards by the actuator, which is not illustrated in FIG. 2, in accordance with an instruction from the system controller 50 for exposure to light, live-view image capturing, or moving image capturing. The mirror 12 is a mirror for switching light flux which is incident from the lens 103 between the viewfinder 16 side and an image capturing unit 22 side. For normal operation, the mirror 12 is arranged in such a manner that light flux is guided towards the viewfinder 16 so that the light flux may be reflected by the viewfinder 16. In the case where image capturing is performed or a live view is displayed, however, the viewfinder 16 is sprung up (mirror up) so that light flux may be guided towards the image capturing unit 22 and retreats from the light flux. Furthermore, the mirror 12 is a half mirror which allows part of light to be transmitted through the central portion of the mirror. Part of light flux is transmitted through the mirror 12 so as to be incident to the focus detection unit 11 for detecting focus. A person who captures an image is able to confirm focus and framing of an optical image of an object which is obtained through the lens unit 150 by observing the focusing screen 13 via a pentaprism 14 and the viewfinder 16.

A shutter 101 is a focal plane shutter which controls an exposure time of the image capturing unit 22 in desired manner under the control by the system controller 50. The image capturing unit 22 is an image capturing element which includes a charge-coupled device (CCD) or a complementary metal-oxide semiconductor (CMOS) element for converting an optical image into an electric signal. An analog-to-digital (A/D) converter 23 is used for converting an analog signal which is output from the image capturing unit 22 into a digital signal.

An image processing unit 24 performs resize processing such as predetermined pixel interpolation and reduction and color conversion processing for data from the A/D converter 23 or a memory controller 15. Furthermore, the image processing unit 24 performs predetermined arithmetic processing using image data which is obtained by image capturing, and the system controller 50 performs exposure control and ranging control based on an obtained arithmetic result. Accordingly, autofocus (AF) processing, automatic exposure (AE) processing, and flash preliminary light emission (EF) processing in a through-the-lens (TTL) method are performed. The image processing unit 24 further performs predetermined arithmetic processing using image data which is obtained by image capturing, and performs auto white balance (AWB) processing in the TTL method based on an obtained arithmetic result.

Data which is output from the A/D converter 23 is written to a memory 32 via the image processing unit 24 and the memory controller 15 or directly via the memory controller 15. The memory 32 stores image data which is obtained by the image capturing unit 22 and converted into digital data by the A/D converter 23 and image data to be displayed on the display unit 28. The memory 32 has a memory capacity which is sufficient for storing a predetermined number of pieces of still image data, moving image data for a predetermined time, and audio data. At the time of recording, image data which is generated via the image capturing unit 22 is written to the memory 32, the image data is compressed in a predetermined compression method by the image processing unit 24, and the compressed image data is written to a recording medium 200.

Furthermore, the memory 32 also has a function as a memory (video memory) for image display. A digital-to-analog (D/A) converter 19 converts data for image display which is stored in the memory 32 into an analog signal, and supplies the analog signal to the display unit 28. Accordingly, the image data for display which is written in the memory 32 is displayed as an image on the display unit 28 via the D/A converter 19. The display unit 28 performs display on a display device such as a liquid crystal display (LCD) in accordance with an analog signal from the D/A converter 19. A digital signal which is analog-to-digital converted by the A/D converter 23 and stored in the memory 32 is converted into an analog signal by the D/A converter 19. Then, by performing sequential transfer and display, the display unit 28 functions as an electronic viewfinder, and may perform through image display (live view (LV) display).

On a liquid crystal display unit 41 within a viewfinder, a frame (AF frame) which indicates a focusing point at which autofocus is currently being performed, an icon which indicates the setting state of the camera, and the like are displayed via a drive circuit 42 for the display unit for a viewfinder. In this embodiment, the AF frame, the icon, and the like which are set by the system controller 50 prior to image capturing preparation are also displayed on the display unit 28. Meanwhile, on the display unit 43 outside of a viewfinder, various setting values of the digital camera 100 including the shutter speed and the diaphragm are displayed via a drive circuit 44 for the display unit outside of a viewfinder.

A nonvolatile memory 56 is a memory which may perform electrical erasing and recording. For example, an electrically erasable programmable read-only memory (EE-PROM) is used as the nonvolatile memory 56. In the nonvolatile memory 56, a constant for operation of the system controller 50, a program, and the like are stored. The program mentioned above represents a program for executing various flowcharts which will be described later in this embodiment.

The system controller 50 controls the entire digital camera 100. The system controller 50 implements various processes in this embodiment which will be described later by executing the above-mentioned program recorded in the nonvolatile memory 56. Furthermore, the system controller 50 also performs display control by controlling the memory 32, the D/A converter 19, the display unit 28, and the like. As a system memory 52, for example, a random access memory (RAM) is used. In the system memory 52, a constant and a variable for operation of the system controller 50, the program which is read from the nonvolatile memory 56, and the like are developed. Furthermore, setting information of an AF mode and other types of information are temporarily recorded in the system memory 52.

A system timer 53 is a timing unit which measures time used for various types of control and measures time of a built-in clock. The mode selection switch 60, a first shutter switch 62, a second shutter switch 64, and an operation unit 70 are operation units for inputting various operation instructions to the system controller 50.

The mode selection switch 60 switches an operation mode of the system controller 50 among a still image capturing mode, a moving image capturing mode, a playback mode, and the like. The moving image capturing mode includes an autofocus (AF) mode, an auto scene determination mode, a manual mode, a diaphragm priority mode (Av mode), and a shutter speed priority mode (Tv mode). In this embodiment, a plurality of AF modes including a face AF mode are provided as AF modes. For example, a mode in which an AF focusing point is set such that the AF focusing point always exists within an enlarged image for enlarged display is also provided. Furthermore, different AF modes may be set for non-scaled display and enlarged display. Types of AF mode will be described later with reference to FIGS. 3A to 3F and FIGS. 4A to 4D. Furthermore, various scene modes for image capturing settings for individual image capturing scenes, a program AE mode, a custom mode, and the like are also provided. When a user operates the mode selection switch 60, one of the above modes is directly selected. Alternatively, after switching to a menu is temporarily performed by the mode selection switch 60, one of the above modes included in the menu may be selected by using a different operation member. Similarly, the moving image capturing mode may include a plurality of modes.

The first shutter switch 62 is turned ON in the process of operation of the shutter button 61 which is provided at the digital camera 100, that is, when the shutter button 61 is so-called half-pressed (image capturing preparation instruction), and a first shutter switch signal SW1 is generated. When the first shutter switch signal SW1 is input to the system controller 50, an operation such as AF processing, AE processing, AWB processing, and EF processing starts.

The second shutter switch 64 is turned ON when operation of the shutter button 61 is completed, that is, when the shutter button 61 is fully pressed (image capturing instruction), and a second shutter switch signal SW2 is generated. Based on the second shutter switch signal SW2, the system controller 50 controls start of an operation of a series of image capturing processing operations from reading of a signal from the image capturing unit 22 to writing of image data to the recording medium 200.

The operation unit 70 includes the electronic main dial 71, the electronic sub-dial 73, the cross key 74, the SET button 75, the LV button 76, the zoom button 77, the reduction button 78, the playback button 79, and the like illustrated in FIGS. 1A and 1B. Furthermore, functions are appropriately assigned to operation members of the operation unit 70 for individual scenes by selecting various function icons displayed on the display unit 28, and the operation members operate as various function buttons. The function buttons include, for example, an end button, a back button, an image feed button, a jump button, a narrowing-down button, an attribute change button, and the like. For example, when the menu button is pressed, a menu screen on which various settings may be made is displayed on the display unit 28. A user is able to perform various settings in an intuitive manner by operating the cross key 74, the SET button 75, and the like while viewing the menu screen displayed on the display unit 28.

A power supply controller 80 includes a battery detection circuit, a DC-DC converter, a switch circuit for switching a block to be electrically connected, and the like, and detects mounting or non-mounting of a battery, the type of a battery, and the remaining battery capacity. Furthermore, the power supply controller 80 controls the DC-DC converter in accordance with a detection result and an instruction of the system controller 50 by selection of the power switch 72, and supplies a necessary amount of voltage to units including the recording medium 200 for a necessary period of time.

A power supply unit 30 includes a primary battery such as an alkali battery or a lithium battery, a secondary battery such as an NiCd battery, an NiMH battery, or an Li battery, an AC adaptor, and the like. A recording medium interface (I/F) 18 is an interface with the recording medium 200 such as a memory card or a hard disk. The recording medium 200 is a recording medium such as a memory card for recording captured image data, and includes a semiconductor memory, a magnetic disk, or the like.

A communication unit 54 is connected wirelessly or connected via a wired cable, and performs transmission and reception of video signals and audio signals. The communication unit 54 may also be connected to a wireless local area network (LAN) and the Internet. The communication unit 54 may transmit image data (including a live view image) obtained by image capturing by the image capturing unit 22 and image data recorded in the recording medium 200. The communication unit 54 may also receive image data and various other types of information from an external apparatus.

An orientation detection unit 55 detects an orientation of the digital camera 100 relative to a gravity direction. Based on the orientation detected by the orientation detection unit 55, a determination can be made whether an image which is captured by the image capturing unit 22 is an image which is captured when the digital camera 100 is held horizontally or an image which is captured when the digital camera 100 is held vertically. The system controller 50 may add orientation information corresponding to the orientation detected by the orientation detection unit 55 to an image file of the image which is captured by the image capturing unit 22 and record a rotated image. Furthermore, an acceleration sensor, a gyro sensor, or the like may be used as the orientation detection unit 55.

Next, a process according to this embodiment will be described with reference to flowcharts of FIGS. 3A to 3F by way of an example in which equal magnification (non-scale) is used as a first magnification ratio and enlarged magnification is used as a second magnification ratio. FIGS. 3A, 3B to 3C and FIGS. 3D, 3E to 3F are flowcharts illustrating examples of a processing procedure for setting positions of AF focusing points for non-scaled display and enlarged display at the time of live view display in an AF mode. Enlarged display described herein represents electronic live view enlargement performed by changing the area read from the image capturing unit 22 not by optical zoom. That is, enlargement processing described herein does not involve driving of a zoom lens. This processing is implemented when the system controller 50 develops a program recorded in the nonvolatile memory 56 to the system memory 52 and executes the program.

First, when the mode selection switch 60 is operated by a user and switching to an AF mode in the still image capturing mode is performed, a process starts. In S301, under the control by the system controller 50, live view display starts in accordance with the above-mentioned procedure.

Figure 4A:
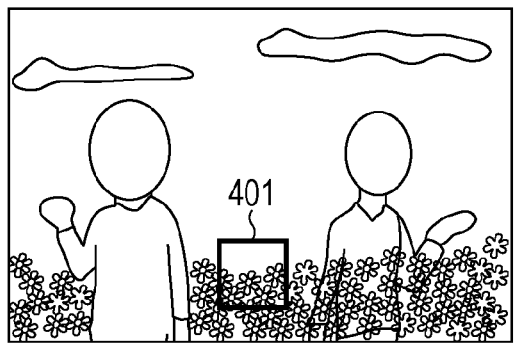
FIGS. 4A to 4D are diagrams for explaining positions of AF focusing points in an AF mode.
Figure 4B:
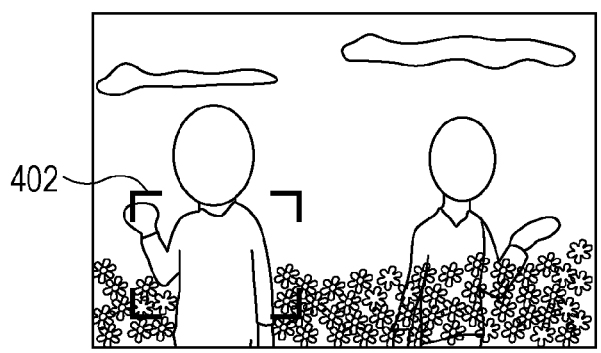
Figure 4C:
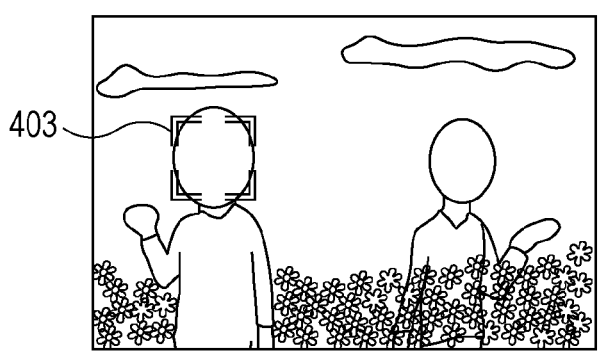

Next, in S302, the system controller 50 displays a live view based on non-scaled display on the display unit 28. FIGS. 4A to 4C are diagrams illustrating display examples of non-scaled display in individual AF modes. FIG. 4A illustrates a display example of the case of an AF mode which is different from a face AF mode and in which an AF focusing point always exists within enlarged display, and a region 401 of a selected AF focusing point is displayed in FIG. 4A. FIG. 4B illustrates a display example of the case of an AF mode which is different from the face AF mode and in which an AF focusing point does not always exist within enlarged display, and a region 402 of a selected AF focusing point is displayed in FIG. 4B. FIG. 4C illustrates a display example of the case where the AF mode is a face AF mode, and a region 403 which is selected as an AF focusing point within a detected face is displayed in FIG. 4C. In the above non-scaled display of live views, an enlarged position may further be displayed.

Next, in S303, the system controller 50 acquires setting information of an AF mode recorded in the system memory 52. Then, in S304, the system controller 50 determines whether or not an instruction for changing AF mode setting is issued by a user. In the case where it is determined, based on a determination result, that an instruction for changing the AF mode is issued (YES at S304), the process proceeds to S305. In the case where it is determined that an instruction for changing the AF mode is not issued (NO at S304), the process proceeds to S306. AF modes which may be set in an operation of S304 and S305 for live view image capturing include modes (1) to (4) which have different methods for selecting a focus adjustment position. The user may select and set one of the modes (1) to (4) described below.

(1) Face+Tracking Priority AF (Face AF)

Focus adjustment is performed by detecting the face of a person who exists in a LV. When the face moves, an AF frame (focus adjustment position) also moves to track the face. When a plurality of faces are detected, left and right arrow marks are displayed at an AF focusing point (AF frame, focus adjustment position), and a face for which the AF frame is to be set is changed in accordance with an operation of the cross key 74. By touching the screen, a face or an object may be selected. In the case where no face is detected or no face or no object is selected by touching the screen, switching to autos selection of live multipoint AF is performed.

(2) Live Multipoint AF

The user selects and sets either auto selection or zone selection. For auto selection, focus is adjusted for a wide area using an AF frame with at most 31 points. For zone selection, an area is divided into nine zones, and focus is adjusted using an AF frame in a zone selected by the user. Every time that the SET button 75 is pressed, switching is performed between auto selection and zone selection. In the case where zone selection is set, a selected zone is switched in accordance with an operation of the cross key 74. When the SET button 75 is pressed, selection returns to the center zone. By touching the display unit 28, a zone may be selected.

(3) Live Single Point AF

Live single point AF is a single point AF mode for performing focus adjustment with an AF frame at a desired single point in a live view in accordance with a user operation. The live single point AF is effective for the case where the user desires to focus on a target object within an image capturing range. An AF frame may be moved by an operation of the cross key 74 or a touch operation for the display unit 28 on which a live view is displayed.

(4) Quick AF

Quick AF is the same AF method as the time of viewfinder image capturing, and focus adjustment is performed based on single-shot AF using a dedicated AF sensor. During AF, display of a live view is temporarily interrupted. One of the following AF modes may be set in advance as an AF focusing area using a dedicated AF sensor.

Single-Point AF (Option)

A single AF frame point to be used for focus adjustment is selected.

Zone AF (Zone Option)

A zone AF mode is a zone selection AF mode in which nineteen AF frames are divided into five focusing zones and focus adjustment is performed using an AF frame included in a zone selected by the user. In zone AF, auto selection AF is performed for all the AF frames of a selected zone. Therefore, focus adjustment is easily performed compared to single-point AF, and zone AF is thus effective for capturing an image of a moving object.

19-Point Auto Selection AF

Focus adjustment is performed using all the AF frames. Basically, focus is adjusted to the closest object.

Among the above AF modes, an "AF mode in which an AF focusing point always exists within enlarged display", which will be described later, corresponds to (3) live single-point AF or (4) quick AF and single-point AF (option). Furthermore, an "AF mode in which an AF focusing point does not always exist within enlarged display" corresponds to (1) face+tracking priority AF (face AF), (2) auto selection and zone selection of live multipoint AF, and (4) zone AF and 19-point auto selection AF of quick AF.

In S305, the system controller 50 records setting information of the AF mode for which the change instruction has been issued in the system memory 52. Then, in S306, the system controller 50 determines whether or not the zoom button 77 of the operation unit 70 is operated by the user to issue an instruction for enlarging a live view. In the case where it is determined, based on a determination result, that an instruction for enlarging a live view has been issued (YES at S306), the process proceeds to S351 of FIG. 3D. In the case where it is determined that an instruction for enlarging a live view has not been issued (NO at S306), the process proceeds to S307.

In S307, the system controller 50 determines whether or not the AF mode recorded in the system memory 52 is a face AF mode. In the case where it is determined, based on a determination result, that the recorded AF mode is a face AF mode (YES at S307), the process proceeds to S308. In the case where it is determined that the recorded AF mode is not a face AF mode, the process proceeds to S327.

In S308, the system controller 50 determines whether or not a face has been detected from a live view image. A known technique for detecting a face ca be used. In the case where it is determined, based on a determination result, that a face has been detected (YES at S308), the process proceeds to S313. In the case where it is determined that no face has been detected (NO at S308), the process proceeds to S309.

In S309, although the face AF mode is set as the AF mode, no face exists in the live view image, and operation in the face AF mode is thus not possible. Therefore, the system controller 50 temporarily sets an AF mode different from the face AF mode as an AF mode for non-scaled display, and records the set AF mode in the system memory 52. In this embodiment, auto selection of live multipoint AF is set.

Next, in S310, the system controller 50 turns OFF a "flag for setting an AF focusing point for non-scaled display to a face close to an AF focusing point for enlarged display", and records the turning off of the flag in the system memory 52. This flag is turned ON at the transition from enlarged display to non-scaled display. Turning on of the flag will be described later in explanation for processing of S317.

Next, in S311, in accordance with setting of the AF mode different from the face AF mode as the AF mode for non-scaled display, the system controller 50 sets an AF focusing point based on the set AF mode, and records the set AF focusing point in the system memory 52. Then, in S312, the system controller 50 sets an AF focusing point for enlarged display at the same position as the AF focusing point for non-scaled display which is set in S311, and records the set AF focusing point in the system memory 52.

Meanwhile, in S313, although the AF mode different from the face AF mode is temporarily set as the AF mode for non-scaled display in S309, face may be detected in the determination in S308. Thus, the system controller 50 sets the face AF mode again as the AF mode operating for non-scaled display so that operation with face AF is possible, and records the set face AF mode in the system memory 52. In the case where the face AF mode is originally set for non-scaled display, the processing of S313 may be omitted.

Next, in S314, the system controller 50 determines whether or not two or more faces have been detected from the live view image. In the case where it is determined, based on a determination result, that two or more faces have been detected (YES at S314), the process proceeds to S317. In the case where it is determined that two or more faces have not been detected, the process proceeds to S315.

In S315, the system controller 50 sets an AF focusing point for non-scaled display to a region of the detected face, and records the set AF focusing point in the system memory 52. Then, in S316, the system controller 50 sets an AF focusing point for enlarged display at the same position as the AF focusing point for non-scaled display which is set in S315, and records the set AF focusing point in the system memory 52.

Meanwhile, in S317, the system controller 50 determines whether or not the "flag for setting an AF focusing point for non-scaled display to a face close to an AF focusing point for enlarged display", which is recorded in the system memory 52, is turned ON. In the case where it is determined, based on a determination result, that the flag is turned ON, the process proceeds to S319. In the case where it is determined that the flag is turned OFF, the process proceeds to S318. The flag is turned ON in S361, which will be described later, at the transition from enlarged display to non-scaled display when the face AF mode is set as the AF mode for non-scaled display. The flag is a flag for setting the AF focusing point for non-scaled display to a face close to the AF focusing point for enlarged display immediately after the transition from enlarged display to non-scaled display.

In S318, the system controller 50 determines a main object among the plurality of detected faces, sets the AF focusing point for non-scaled display to a face region of the main object, and records the set AF focusing point in the system memory 52. A method for determining the main object is not particularly limited. However, a face close to the center may be determined as a main object. Alternatively, a face with the largest face region may be determined as a main object.

Meanwhile, in S319, since the "flag for setting an AF focusing point for non-scaled display to a face close to an AF focusing point for enlarged display" is turned ON, the system controller 50 preferentially sets an AF focusing point to the face closest to the AF focusing point for enlarged display among the plurality of detected faces. This operation will be described below with reference to FIGS. 5A and 5B.

For example, in the case where an AF focusing point is set at a position which is in a lower left part of the entire image for enlarged display and which is in a region 501 in FIG. 5A, after returning to non-scaled display, the AF focusing point is set to a region 502 of a left face in FIG. 5B.

Next, in S320, the system controller 50 determines whether the face set as the AF focusing point for non-scaled display is not able to be detected. In the case where it is determined, based on a determination result, that the face set as the AF focusing point is not able to be detected, the process proceeds to S321. In the case where it is determined that the face set as the AF focusing point is able to be detected, the process proceeds to S323.

In S321, the system controller 50 turns OFF the "flag for setting an AF focusing point for non-scaled display to a face close to an AF focusing point for enlarged display", and records the turning off of the flag in the system memory 52. Then, in S322, since the face set as the AF focusing point for non-scaled display is not able to be detected, the system controller 50 determines a main object among other detected faces, sets an AF focusing point for non-scaled display to a face region of the main object, and records the set AF focusing point in the system memory 52.

Meanwhile, in S323, in the state in which a plurality of faces are detected, the cross key 74 or the like of the operation unit 70 is operated by the user, and the system controller 50 determines whether or not an instruction for switching a face to be set as the AF focusing point has been issued. In the case where it is determined, based on a determination result, that the switching instruction has been issued, the process proceeds to S324. In the case where it is determined that the switching instruction has not been issued, the process proceeds to S326.

In S324, the system controller 50 turns OFF the "flag for setting an AF focusing point for non-scaled display to a face close to an AF focusing point for enlarged display", and records the turning off of the flag in the system memory 52. Then, in S325, the system controller 50 sets the AF focusing point for non-scaled display to the switched face, and records the set AF focusing point in the system memory 52.

In S326, the system controller 50 sets the AF focusing point for enlarged display at the same position as the AF focusing point for non-scaled display, and records the set AF focusing point in the system memory 52.

Meanwhile, in S327, the system controller 50 determines whether or not the cross key 74 or the like of the operation unit 70 is operated by the user and an instruction for changing an AF focusing point has been issued. In the case where it is determined, based on a determination result, that an instruction for changing an AF focusing point has been issued, the process proceeds to S328. In the case where it is determined that an instruction for changing an AF focusing point has not been issued, the process proceeds to S330.

In S328, the system controller 50 sets the AF focusing point for which the change instruction has been issued by the operation unit 70, and records the set AF focusing point in the system memory 52. Then, in S329, the system controller 50 changes the AF focusing point for enlarged display to the same position as the position of the AF focusing point which is changed in S328, and records the changed AF focusing point in the system memory 52.

In S330, the system controller 50 determines whether or not the first shutter switch 62 is turned ON by half-press of the shutter button 61 (image capturing preparation instruction) and the first shutter switch signal SW1 has been generated. In the case where it is determined, based on a determination result, that the first shutter switch signal SW1 has been generated, the process proceeds to S331. In the case where it is determined that the first shutter switch signal SW1 has not been generated, the process returns to S303.

In S331, the system controller 50 controls the lens unit 150 to detect focus at the set focusing point in accordance with the set AF mode, and performs an AF operation. Then, in S332, the system controller 50 determines whether or not half-press of the shutter button 61 (image capturing preparation instruction) is completed, the first shutter switch 62 is turned OFF, and generation of the first shutter switch signal SW1 has stopped. In the case where it is determined, based on a determination result, that generation of the first shutter switch signal SW1 has stopped, the process proceeds to S333. In the case where it is determined that generation of the first shutter switch signal SW1 has not stopped, the process proceeds to S334.

In S333, the system controller 50 performs control to stop the AF operation.

Meanwhile, in S334, the system controller 50 determines whether or not the second shutter switch 64 is turned ON by full press of the shutter button 61 (image capturing instruction), and the second shutter switch signal SW2 has been generated. In the case where it is determined, based on a determination result, that the second shutter switch signal SW2 has been generated, the process proceeds to S335. In the case where it is determined that the second shutter switch signal SW2 has not been generated, the process returns to S331.

In S335, the system controller 50 performs the series of image capturing processing operations described above, and records image data in the recording medium 200. Then, the process returns to S302.

Next, the case where enlarged display is performed will be described below.

Figure 3C:
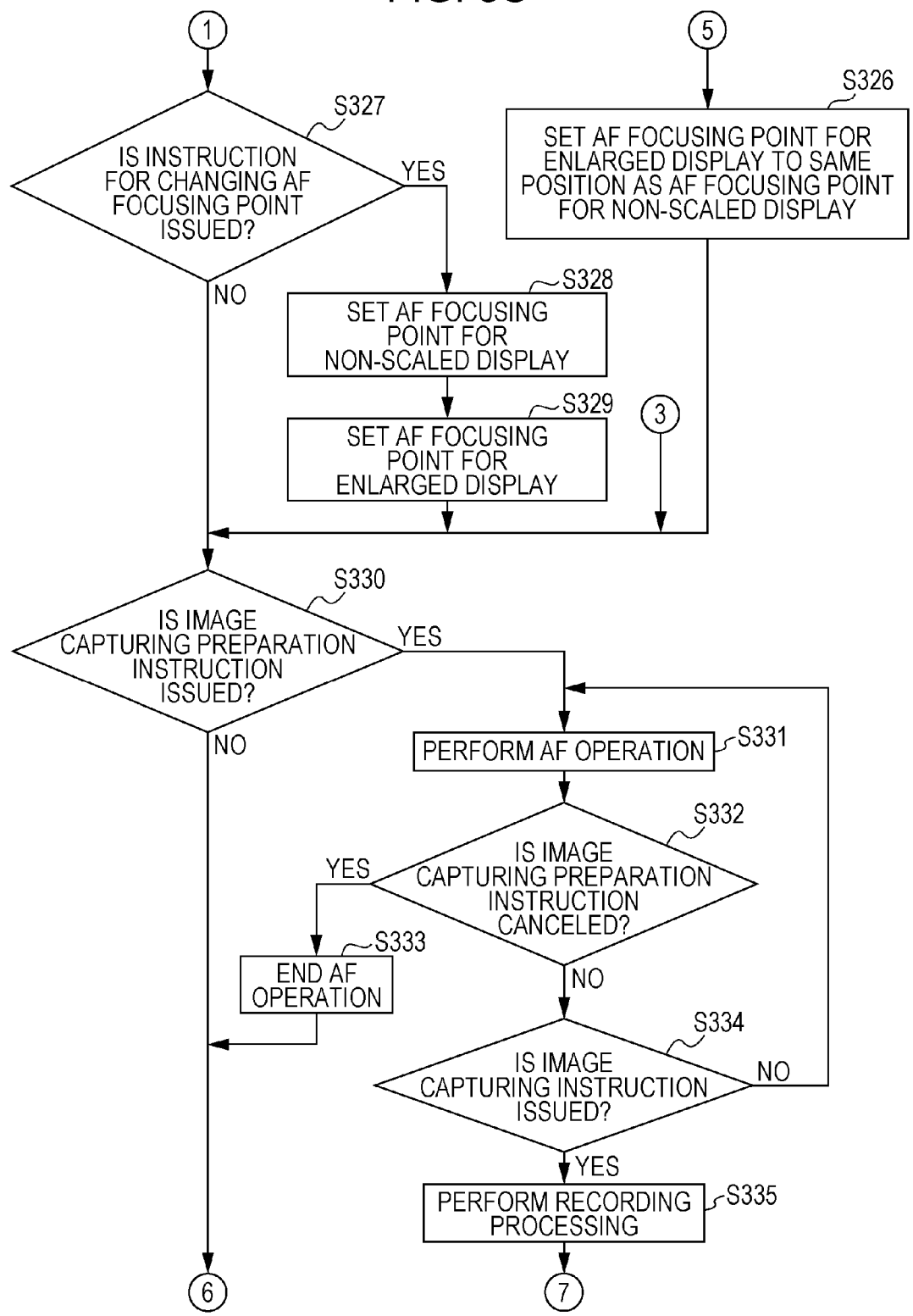
Figure 3D:
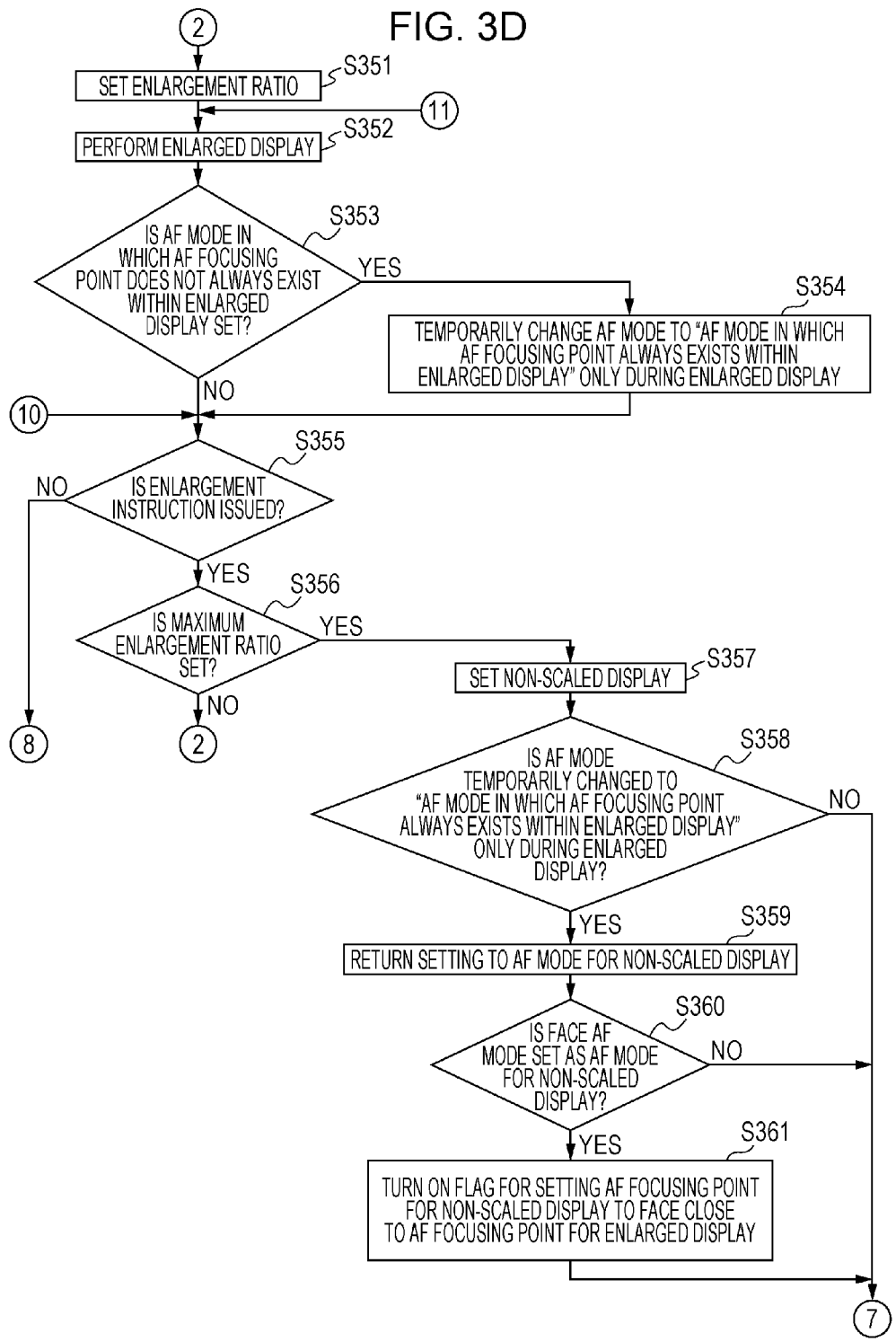
FIGS. 3D to 3F are flowcharts illustrating an example of a processing procedure for setting an AF focusing point operating for enlarged display.
Figure 3E:
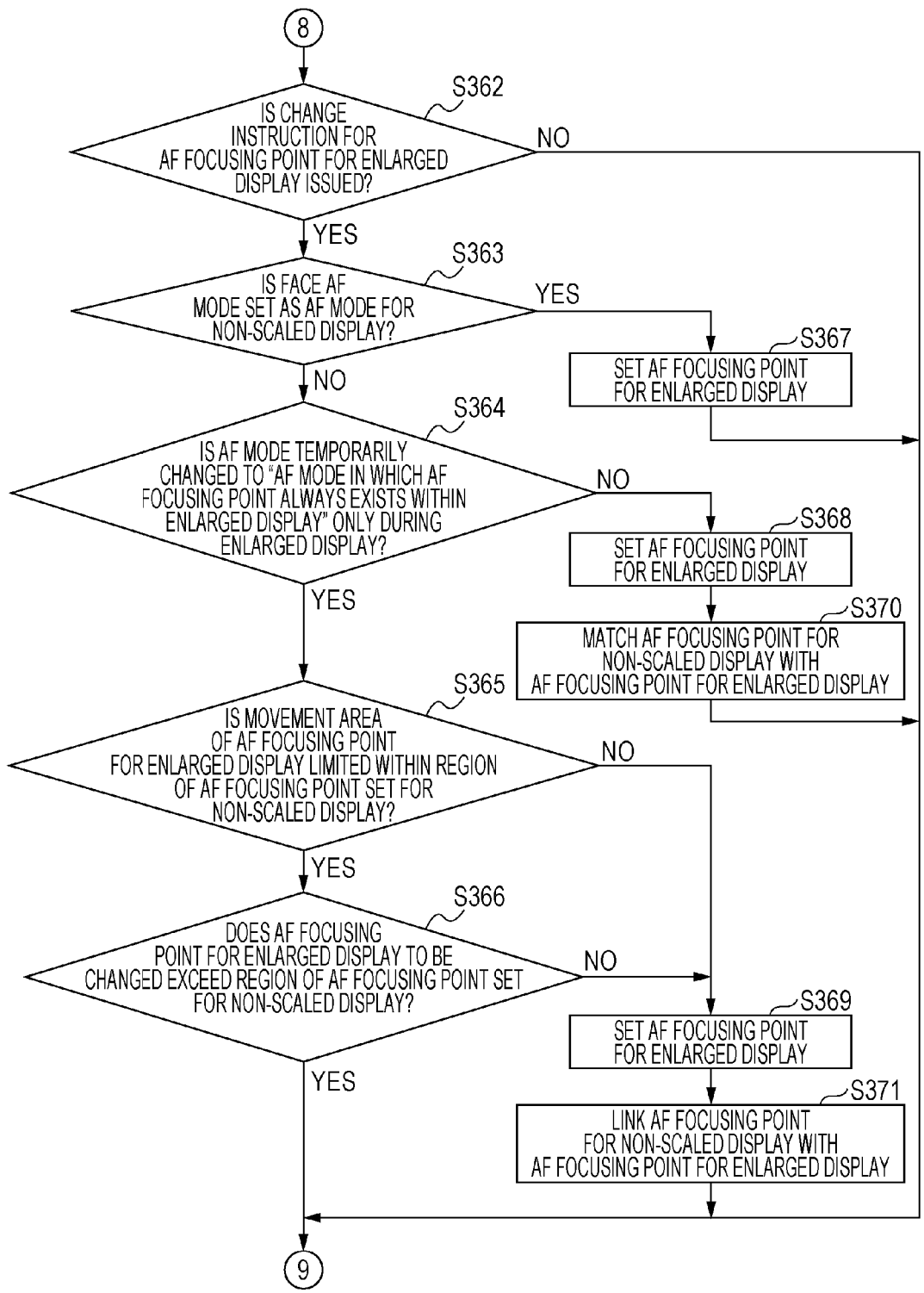

In S351 of FIG. 3D, the system controller 50 increases the enlargement ratio of a live view in accordance with a live view enlargement instruction, and records the increased enlargement ratio in the system memory 52.

Figure 4D:
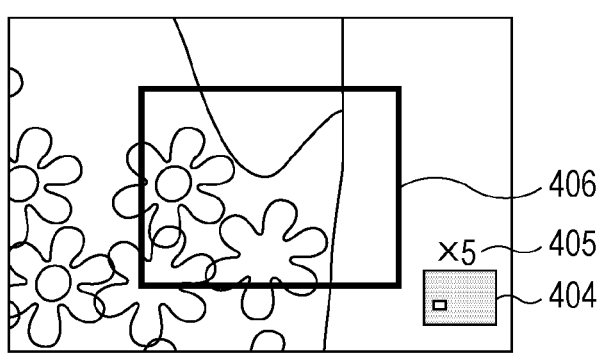

Next, in S352, the system controller 50 enlarges the live view in accordance with the enlargement ratio recorded in the system memory 52, and displays the enlarged live view on the display unit 28. That is, by reducing the area read from the image capturing unit 22 and increasing the resolution, the live view is electronically enlarged and displayed. The enlarged display in S352 does not involve driving of a zoom lens. FIG. 4D illustrates an example of an enlarged and displayed live view. In FIG. 4D, an indicator 404 which indicates an enlarged position, an enlargement ratio 405, and a region 406 of an AF focusing point are also displayed.

Next, in S353, the system controller 50 determines whether or not the AF mode recorded in the system memory 52 is an AF mode in which an AF focusing point does not always exist within enlarged display. In the above-mentioned face AF mode, the AF focusing point does not exist within enlarged display depending on the position of the detected face. Therefore, the face AF mode corresponds to the AF mode in which an AF focusing point does not always exist within enlarged display. In the case where it is determined, based on a determination result, that the recorded AF mode is an AF mode in which an AF focusing point does not always exist within enlarged display, the process proceeds to S354. In the case where it is determined that the recorded AF mode is not an AF mode in which an AF focusing point does not always exist within enlarged display, the process proceeds to S355.

In S354, since an AF operation cannot be performed with enlarged display in the case where an AF focusing point does not exist in enlarged display, the system controller 50 temporarily changes the AF mode to an "AF mode in which an AF focusing point always exists within enlarged display" only during enlarged display. Specifically, the AF mode is changed to live single-point AF or quick AF and single-point AF (option). Then, information of the change is recorded in the system memory 52.

In S355, the system controller 50 determines whether or not the zoom button 77 of the operation unit 70 is operated by the user and an instruction for enlarging the live view has been issued. In the case where it is determined, based on a determination result, that the instruction for enlarging the live view has been issued (YES at S355), the process proceeds to S356. In the case where it is determined that the instruction for enlarging the live view has not been issued (NO at S355), the process proceeds to S362.

In S356, the system controller 50 determines whether or not the enlargement ratio of the live view which is recorded (set) in the system memory 52 in S351 is the maximum value. In the case where it is determined, based on a determination result, that the enlargement ratio is the maximum value (YES at S356), the process proceeds to S357. In the case where it is determined that the enlargement ratio is not the maximum value (NO at S356), the process returns to S351.

In S357, the system controller 50 changes display setting regarding the magnification ratio to non-scaled display, and records the setting information in the system memory 52. Then, in S358, the system controller 50 determines whether or not the AF mode is temporarily changed to the "AF mode in which an AF focusing point always exists within enlarged display" only during enlarged display in S354. In the case where it is determined, based on a determination result, that the AF mode is changed to the "AF mode in which an AF focusing point always exists within enlarged display" (YES at S358), the process proceeds to S359. In the case where it is determined that the AF mode is not changed to the "AF mode in which an AF focusing point always within enlarged display" (NO at S358), the process returns to S302 of FIG. 3A.

In S359, at the transition from enlarged display to non-scaled display, the system controller 50 returns the AF mode which is set in S354 to the original AF mode for non-scaled display, and records the set AF mode in the system memory 52. Then, in S360, the system controller 50 determines whether or not the AF mode for non-scaled display which is recorded in the system memory 52 is a face AF mode. In the case where it is determined, based on a determination result, that the recorded AF mode is a face AF mode (YES at S360), the process proceeds to S361. In the case where it is determined that the recorded AF mode is not a face AF mode (NO at S360), the process returns to S302.

In S361, the system controller 50 turns ON the flag for setting an AF focusing point for non-scaled display to a face close to an AF focusing point for enlarged display. Then, the process returns to S302. As described in the explanation for the processing of S317, this flag is a flag for setting an AF focusing point for non-scaled display to a face close to an AF focusing point for enlarged display immediately after transition from enlarged display to non-scaled display.

Meanwhile, when an enlargement instruction is not issue at S355, the system controller 50 determines in S362 whether or not the cross key 74 or the like of the operation unit 70 is operated by the user and an instruction for changing the AF focusing point for enlarged display has been issued. In the case where it is determined, based on a determination result, that an instruction for changing the AF focusing point for enlarged display has been issued (YES at S362), the process proceeds to S363. In the case where it is determined that an instruction for changing the AF focusing point for enlarged display has not been issued (NO at S362), the process proceeds to S372.

In S363, the system controller 50 determines whether or not the AF mode for non-scaled display which is recorded in the system memory 52 is a face AF mode. In the case where it is determined, based on a determination result, that the recorded AF mode is a face AF mode (YES at S363), the process proceeds to S367. In the case where it is determined that the recorded AF mode is not a face AF mode (NO at S363), the process proceeds to S364.

In S364, the system controller 50 determines whether or not the AF mode is temporarily changed to the "AF mode in which an AF focusing point always exists within enlarged display" only during enlarged display. In the case where it is determined, based on a determination result, that the AF mode is changed to the "AF mode in which an AF focusing point always exists within enlarged display" (YES at S364), the process proceeds to S365. In the case where it is determined that the AF mode is not changed to the "AF mode in which an AF focusing point always exists within enlarged display" (NO at S364), the process proceeds to S368.

In S365, the system controller 50 determines whether or not the movement area of the AF focusing point for enlarged display is limited within the region of the AF focusing point set for non-scaled display. Setting as to whether or not to limit the movement area within the region of the AF focusing point may be performed on a menu screen in accordance with a user operation. In the case where it is determined, based on a determination result, that the movement area of the AF focusing point for enlarged display is limited within the region of the AF focusing point set for non-scaled display (YES at S365), the process proceeds to S366. In the case where it is determined that the movement area of the AF focusing point for enlarged display is not limited within the region of the AF focusing point set for non-scaled display (NO at S365), the process proceeds to S369.

In S366, the system controller 50 determines whether or not the AF focusing point for enlarged display for which the change instruction has been issued by operation on the cross key 74 or the like of the operation unit 70 by the user exceeds the region of the AF focusing point for non-scaled display. In the case where it is determined, based on a determination result, that the AF focusing point for enlarged display for which the change instruction has been issued exceeds the region of the AF focusing point set for non-scaled display (YES at S366), the process proceeds to S372 without changing the AF focusing point for enlarged display. In the case where it is determined that the AF focusing point for enlarged display for which the change instruction has been issued does not exceed the region of the AF focusing point set for non-scaled display (NO at S366), the process proceeds to S369. In the example of FIG. 4A, in the case where the AF focusing point for enlarged display for which the change instruction has been issued exists within the region 401 of the AF focusing point for non-scaled display, the AF focusing point for enlarged display is changed to the position. In the case where the AF focusing point for enlarged display for which the change instruction has been issued does not exist within the region 401 of the AF focusing point for non-scaled display, the AF focusing point for enlarged display is not changed.

In S367, the system controller 50 records the AF focusing point for enlarged display for which the change instruction has been issued by the user operation in the system memory 52. At this time, at the time of moving the AF focusing point for enlarged display, the display position for enlarged display may be moved. Also in S368 and S369, the system controller 50 performs the same processing as the processing of S367; that is, the system controller 50 records in the system memory 52 the AF focusing point for enlarged display for which the change instruction has been issued by the user operation.

In S370, the system controller 50 sets the AF focusing point for non-scaled display at the same position as the AF focusing point for enlarged display, and records the set AF focusing point in the system memory 52. That is to say, in S370, the system controller 50 matches the AF focusing point for non-scaled display with the same position as the AF focusing point for enlarged display.

On the other hand, in S371, the system controller 50 links (synchronizes) the position of the AF focusing point for non-scaled display with the position of the AF focusing point for enlarged display, and records the linked positions in the system memory 52. This operation will be described below with reference to FIGS. 6A to 6C.

Figure 6C:
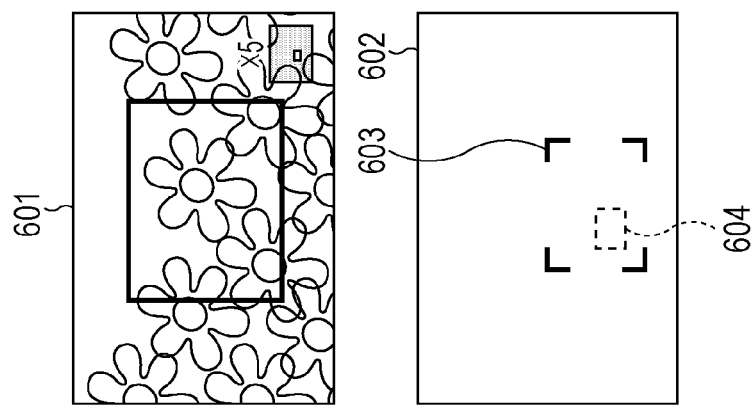
FIGS. 6A to 6C are diagrams for explaining a method for setting a region of an AF focusing point for non-scaled display after an instruction for changing an AF focusing point for enlarged display is issued.
Figure 6B:
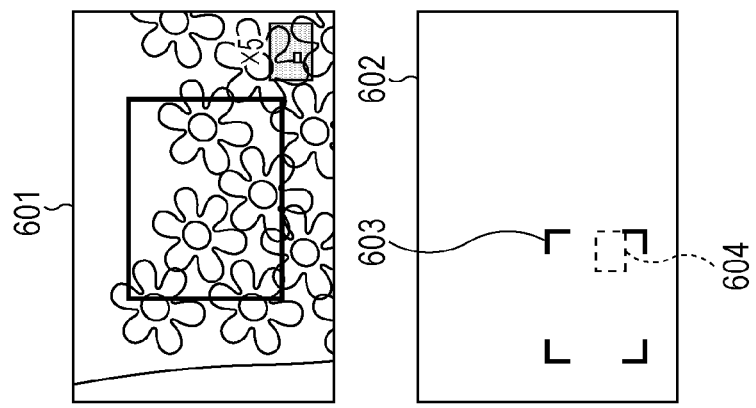
Figure 6A:
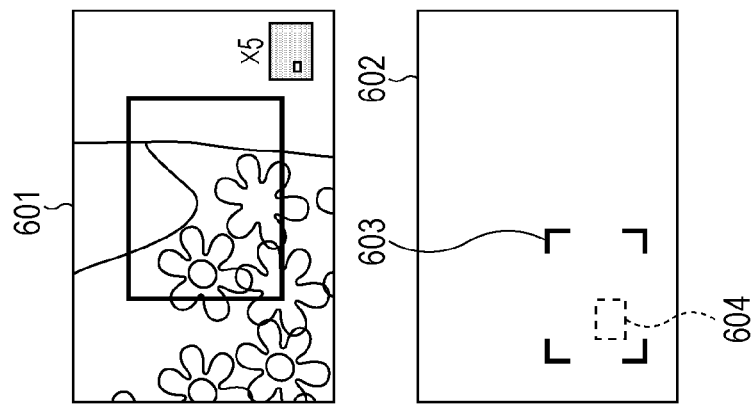

An image 601 in FIG. 6A indicates a display example of enlarged display. An image 602 in FIG. 6A indicates the positional relationship between an AF focusing point for enlarged display and an AF focusing point for non-scaled display. A frame 603 represents the region of an AF focusing point for non-scaled display, and a frame 604 represents the region of an AF focusing point for enlarged display. In the example of FIG. 6A, zone AF (AF with zone selection of live multipoint AF) is performed in an AF mode for non-scaled display, and single-point AF is performed for enlarged display. The size of the region of an AF focusing point is different between non-scaled display and enlarged display.

First, AF focusing points for enlarged display and non-scaled display are set to the positions illustrated in FIG. 6A, and the position of the AF focusing point for non-scaled display is not changed in the case where the AF focusing point for enlarged display 604 is moved within the region of the AF focusing point for non-scaled display 603, as illustrated in FIG. 6B. In contrast, as illustrated in FIG. 6C, in the case where the AF focusing point for enlarged display 604 is moved outside the region of the AF focusing point for non-scaled display 604, the position of the AF focusing point for non-scaled display is changed in association with the position of the AF focusing point for enlarged display (in the case where the determination result in S365 is NO).

The position of the AF focusing point for non-scaled display may be changed at the time when an AF operation is performed. There may be a case where a user does not intend to change the position of the AF focusing point but only wants to change the position of enlarged display. Due to such a reason, the AF focusing point for non-scaled display may not always be changed when the AF focusing point for enlarged display is moved before an AF operation is performed.

Next, in S372, the system controller 50 determines whether or not the first shutter switch 62 is turned ON by half-press of the shutter button 61 (image capturing preparation instruction) and the first shutter switch signal SW1 has been generated. In the case where it is determined, based on a determination result, that the first shutter switch signal SW1 has been generated (YES at S372), the process proceeds to S373. In the case where it is determined that the first shutter switch signal SW1 has not been generated (NO at S372), the process returns to S355.

Figure 3F:
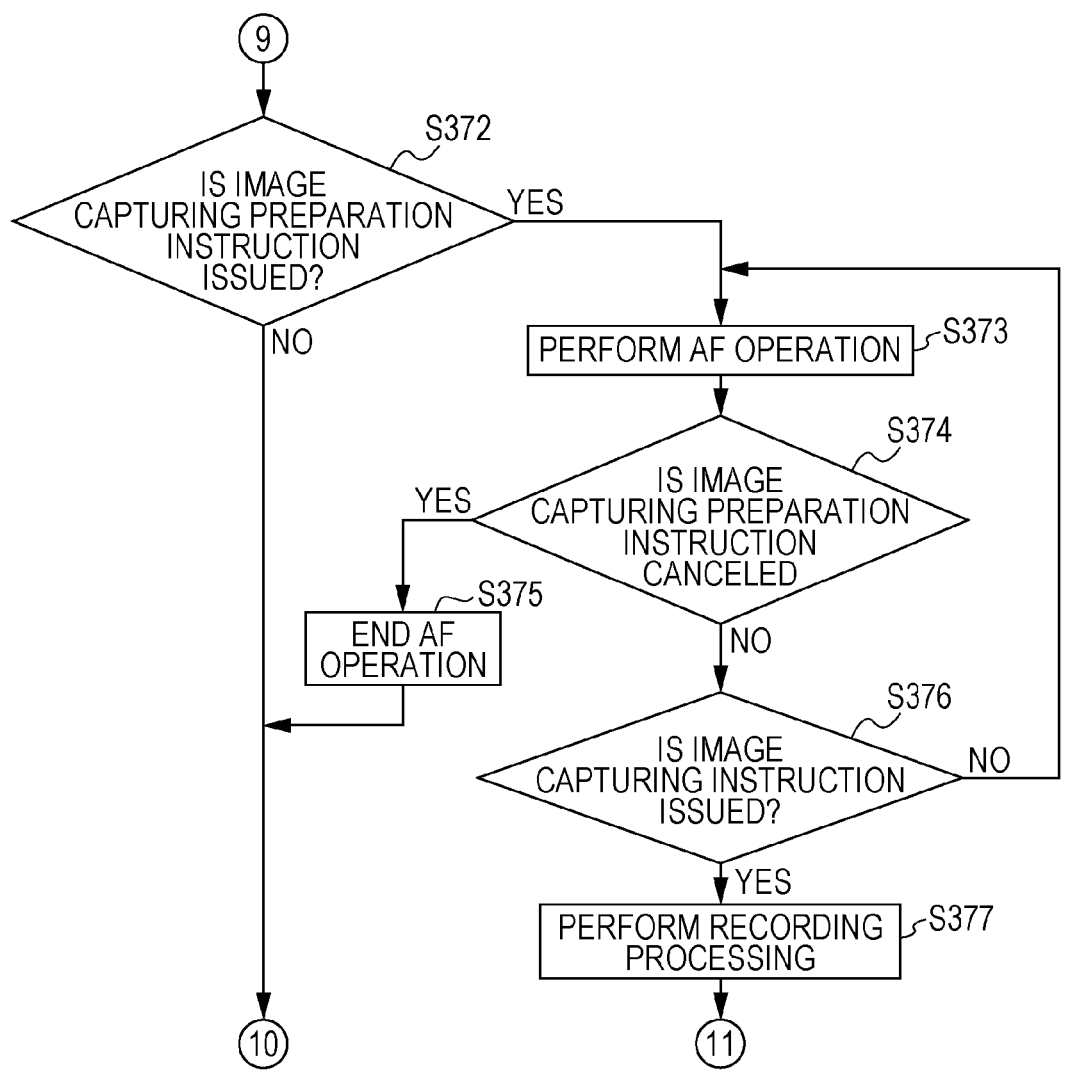

In S373, in FIG. 3F, the system controller 50 controls the lens unit 150 to detect focus (perform focus adjustment) at the focusing point which is set in accordance with the AF mode set in the enlarged state with enlarged display, and performs an AF operation. In the case where the AF operation is performed in S373 without performing the processing of S370 and S371, control for matching/linking the AF focusing point for non-scaled display with the AF focusing point for enlarged display may be performed. Thus, the focusing point at which an AF operation has not actually been performed even if the AF focusing point is tentatively changed for enlarged display, is not reflected in the focusing point based on non-scaled display.

In S374, the system controller 50 determines whether or not the half-press of the shutter button 61 (image capturing preparation instruction) is completed, the first shutter switch 62 is turned OFF, and the generation of the first shutter switch signal SW1 has stopped. In the case where it is determined, based on a determination result, that the generation of the first shutter switch signal SW1 has stopped (YES at S374), the process proceeds to S375. In the case where it is determined that the generation of the first shutter switch signal SW1 has not stopped (NO at S374), the process proceeds to S376.

In S375, the system controller 50 performs control to stop the AF operation.

Meanwhile, in S376, it is determined whether or not the second shutter switch 64 is turned ON by full press of the shutter button 61 (image capturing instruction) and the second shutter switch signal SW2 has been generated. In the case where it is determined, based on a determination result, that the second shutter switch signal SW2 has been generated (YES at S376), the process proceeds to S377. In the case where it is determined that the second shutter switch signal SW2 has not been generated (NO at S376), the process returns to S373.

In S377, the system controller 50 performs a series of image capturing processing operations described above, and records image data in the recording medium 200. Then, the process returns to S352.

As described above, according to this embodiment, in the case where enlarged display is performed in the state in which the first AF mode, which is set for non-scaled display, is set, the second AF mode is set, and in the case where an instruction for changing an AF focusing point for enlarged display is issued, an AF focusing point for non-scaled display is set based on the changed position of the AF focusing point. Furthermore, in the case where the AF mode for non-scaled display is set to the face AF mode, when an instruction for changing the AF focusing point for enlarged display is issued, the AF focusing point for non-scaled display is set to the face closest to the changed AF focusing point for enlarged display. As described above, even in the case where an operating AF mode is different between non-scaled display and enlarged display, the position of an AF focusing point may be linked between non-scaled display and enlarged display.

Control at the system controller 50 may be performed by a single piece of hardware, or the entire apparatus may be controlled by sharing processes among a plurality of pieces of hardware. Furthermore, although the present invention has been described based on an embodiment, the present invention is not limited to the particular embodiment, and various aspects may be included in the present invention without departing from the gist of the present invention. Furthermore, each of the foregoing embodiments merely illustrate an embodiment of the present invention, and the foregoing embodiments may be combined in an appropriate manner.

Furthermore, in the foregoing embodiments, a case where the present invention is applied to a digital camera has been explained by way of an example. However, the present invention is not limited to this example. The present invention may be applied to any apparatus which is able to link the position of an AF focusing point between non-scaled display and enlarged display. That is, the present invention may also be applied to a mobile phone terminal, a digital video camera, and the like.

Embodiment(s) of the present invention can also be realized by a computer of a system or apparatus that reads out and executes computer executable instructions (e.g., one or more programs) recorded on a storage medium (which may also be referred to more fully as a 'nontransitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166982, filed Aug. 26, 2015, which is hereby incorporated by reference herein in its entirety.

What is claimed is:

1. An image capturing apparatus comprising:
an image capturing unit;
a display controller configured to perform control such that a live view image which is captured by the image capturing unit is displayed on a display unit;
a magnification ratio changing unit configured to change a magnification ratio of the live view image which is displayed on the display unit;
an AF mode setting unit configured to set one of a plurality of AF modes in which a focus adjustment position to be used for focus detection is selected according to the set AF mode; and
a controller configured to perform control such that in a case where a first AF mode is set by the AF mode setting unit and a change is made from a first magnification ratio to a second magnification ratio which is greater than the first magnification ratio by the magnification ratio changing unit, the live view image is enlarged and displayed at the second magnification ratio and the AF mode is set to a second AF mode, and such that in a case where a change to the first magnification ratio is made after the second magnification ratio is set, the first AF mode is set and the focus adjustment position is set based on a focus adjustment position which is set in the second AF mode.

2. The image capturing apparatus according to claim 1, further comprising:
a position setting unit configured to set the focus adjustment position,
wherein in a state in which the second AF mode is set in accordance with the change to the second magnification ratio made in a state in which the first AF mode is set, the position setting unit is able to change the focus adjustment position in accordance with a user operation.

3. The image capturing apparatus according to claim 1, wherein the first AF mode is a zone selection AF mode in which an image capturing range is divided into a plurality of zones and focus adjustment is performed at a focus adjustment position in a zone which is selected by a user.

4. The image capturing apparatus according to claim 3, wherein provided that the focus adjustment position is changed in accordance with a user operation in a state in which the second AF mode is set in accordance with the change to the second magnification ratio made in a state in which the first AF mode is set,
in a case where the focus adjustment position which is changed at the second magnification ratio exists within a zone which is set before the change to the second magnification ratio is made, when the magnification ratio returns to the first magnification ratio from the second magnification ratio, the controller sets the first AF mode, and does not change the zone which is set in the zone selection AF mode from the zone which is set before the change to the second magnification ratio is made, and
in a case where the focus adjustment position which is changed at the second magnification ratio exists outside the zone which is set before the change to the second magnification ratio is made, when the magnification ratio returns to the first magnification ratio from the second magnification ratio, the controller sets the first AF mode, and changes the zone which is set in the zone selection AF mode from the zone which is set before the change to the second magnification ratio is made into a zone which corresponds to the changed focus adjustment position.

5. The image capturing apparatus according to claim 3, further comprising a limiting unit configured to perform limiting such that in a state in which the second AF mode is set in accordance with the change to the second magnification ratio made in a state in which the zone selection AF mode is set, the focus adjustment position in the second AF mode is able to be changed only within the zone which is selected in the zone selection AF mode at the first magnification ratio.

6. The image capturing apparatus according to claim 1, wherein the first AF mode is a face AF mode in which a face detected from the live view image is set as the focus adjustment position.

7. The image capturing apparatus according to claim 6, wherein the controller performs control such that in a case where the second AF mode is set in accordance with the change to the second magnification ratio made in a state in which the face AF mode is set and the change to the first magnification ratio is then made, the face AF mode is set, and such that in a case where a plurality of faces are detected from the live view image, the focus adjustment position is set to a face closest to the focus adjustment position which is set in the second AF mode.

8. The image capturing apparatus according to claim 6, wherein the controller performs control such that in a case where the second AF mode is set in accordance with the change to the second magnification ratio made in a state in which the face AF mode is set and the change to the first magnification ratio is then made, the face AF mode is set, and such that in a case where no face is detected from the live view image, the focus adjustment position is set to the focus adjustment position which is set in the second AF mode.

9. The image capturing apparatus according to claim 1, wherein in a case where the focus adjustment position is set in a state in which the second AF mode is set in accordance with the change to the second magnification ratio made in a state in which the first AF mode is set, the change to the first magnification ratio is then made, and the focus adjustment position is set, when the change to the second magnification is further made, a position based on the focus adjustment position which is set at the first magnification ratio is set as the focus adjustment position.

10. The image capturing apparatus according to claim 1, wherein the first AF mode is a single-point AF mode in which focus adjustment is performed at a single-point focus adjustment position which is set at a desired position in the live view image in accordance with a user operation.

11. The image capturing apparatus according to claim 1, wherein the controller:
  performs control such that in a case where the focus adjustment position is changed and an AF operation is performed in a state in which the second AF mode is set in accordance with the change to the second magnification ratio made in a state in which the first AF mode is set, when the change to the first magnification ratio is then made, the first AF mode is set and the focus adjustment position is set based on the focus adjustment position which is set in the second AF mode, and
  performs control such that in a case where the focus adjustment position is changed in a state in which the second AF mode is set in accordance with the change to the second magnification ratio made in a state in which the first AF mode is set, when the change to the first magnification ratio is then made without an AF operation being performed, the first AF mode is set and the focus adjustment position is set based on the focus adjustment position which is set before the change to the second magnification ratio is made.

12. A control method for an image capturing apparatus which includes an image capturing unit, the method comprising:
  a display control step of performing control such that a live view image which is captured by the image capturing unit is displayed on a display unit;
  a magnification ratio changing step of changing a magnification ratio of the live view image which is displayed on the display unit;
  an AF mode setting step of setting one of a plurality of AF modes in which a focus adjustment position to be used for focus detection is selected according to the set AF mode; and
  a control step of performing control such that in a case where a first AF mode is set and a change is made from a first magnification ratio to a second magnification ratio which is greater than the first magnification ratio by the magnification ratio changing step, the live view image is enlarged and displayed at the second magnification ratio and the AF mode is set to a second AF mode, and such that in a case where a change to the first magnification ratio is made after the second magnification ratio is set, the first AF mode is set and the focus adjustment position is set based on a focus adjustment position which is set in the second AF mode.

13. A non-transitory computer-readable recording medium which stores a program for causing a computer to function as each of the units and controllers of the image capturing apparatus according to claim 1.

\* \* \* \* \*